United States Patent
Gunnell et al.

[15] 3,636,300
[45] Jan. 18, 1972

[54] METHOD FOR THE PRODUCTION OF HIGH-TEMPERATURE GASES

[72] Inventors: Thomas J. Gunnell; Albert F. Stegelman, both of Bartlesville, Okla.

[73] Assignee: Phillips Petroleum Company

[22] Filed: Jan. 30, 1969

[21] Appl. No.: 795,323

Related U.S. Application Data

[63] Continuation of Ser. No. 518,332, Jan. 3, 1966, abandoned.

[52] U.S. Cl. ..........................219/121 P, 13/1, 23/209.3
[51] Int. Cl. ................................................H05b 7/00
[58] Field of Search ............23/209.3, 259.5; 204/173, 164, 204/172, 323, 324; 13/149; 219/10.41, 10.65, 121 P

[56] References Cited

UNITED STATES PATENTS

| 3,004,137 | 10/1961 | Karlovitz | 204/64 X |
| 3,051,639 | 8/1962 | Anderson | 204/172 |
| 3,232,746 | 2/1966 | Karlovitz | 23/209.3 X |
| 3,288,696 | 11/1966 | Orbach | 204/173 |
| 3,344,051 | 9/1967 | Latham | 204/173 |
| 3,409,403 | 11/1968 | Bjornson et al. | 23/209.3 |

*Primary Examiner*—Edward J. Meros
*Attorney*—Young and Quigg

[57] ABSTRACT

Hot gases are formed by establishing an electrical discharge in substantially uniform distribution throughout a zone, passing a gas through said zone in the absence of a flame and in contact with said discharge to increase the temperature of said gas, said electrical discharge being distributed substantially uniformly through said gas. High-temperature gases formed by said method are useful in the production of carbon black.

5 Claims, 5 Drawing Figures

INVENTOR.
T. J. GUNNELL
A. F. STEGELMAN
BY Young & Quigg
ATTORNEYS

METHOD FOR THE PRODUCTION OF HIGH-TEMPERATURE GASES

This is a continuation-in-part of our application Ser. No. 518,332, filed Jan. 3, 1966 which issued as U.S. Pat. No. 3,468,632.

This invention relates to a method and apparatus for production of high temperature gases and carbon black. In one aspect this invention relates to apparatus for production of high temperature gases useful in the production of carbon black, and elsewhere. In another aspect this invention relates to a method for the production of high-temperature gases. In another aspect this invention relates to a method for the production of carbon black.

For several years carbon black has been produced in large quantities in furnaces. For example, it is known in the prior art to produce carbon black by directing a hot oxidizing or combustion gas in a generally helical path adjacent the periphery of a generally cylindrical reaction zone and directing a carbonaceous reactant material axially into said zone inside the helically moving mass of hot gas. The reactant is thereby rapidly heated to a carbon black-forming temperature and reacted in said zone to form carbon black, which is subsequently recovered. Processes of this type are illustrated in U.S. Pat. Nos. 2,375,795; 2,375,796; 2,375,797; and 2,375,798 (1945). Another similar process, disclosed and claimed in U.S. Pat. No. 2,564,700 (1951), involves the injection of a combustible mixture of fuel and oxidizing gas circumferentially or tangentially into a combustion zone and the reaction of the mixture by combustion near the periphery of said zone. The resulting combustion gas, at a high temperature, travels in a generally spiral path towards the axis of said combustion zone and is then directed in a generally helical path adjacent the periphery of a reaction zone which is contiguous with, of smaller diameter than, and in open communication with, said combustion zone. A carbonaceous reactant is directed along the common axis of said zones and is rapidly heated to a carbon black-forming temperature by virtue of heat directly imparted from the helically-moving combustion gas. The reactant is reacted within the reaction zone to form carbon black, which is subsequently recovered. This type of process is known as a precombustion process, since the hot gas is substantially completely formed by combustion prior to contact with the reactant.

The reaction mixture formed in processes of the type described above comprises a suspension of carbon black in combustion gas. It is known in the prior art to withdraw such a mixture from the reaction zone and to cool the mixture suddenly by the direct injection thereinto of a cooling liquid, such as water, in order to cool the mixture suddenly to a temperature at which no further reaction can occur.

In the above-described processes for producing carbon black, large quantities of heat are required. In those areas where fuel supplies are limited or must be imported, the cost of the fuel necessary to supply the required amount of heat can be excessive. It would thus be desirable to supply a portion of the heat from other sources. In some areas heat from electrical power is more readily available or less expensive than heat obtained from the burning of a fuel or the carbonaceous reactant. However, it is not desirable or feasible in the production of carbon black to supply all the necessary heat by electrical power because, generally speaking, carbon blacks produced in an atmosphere of combustion gases give superior results for most uses.

Methods for increasing the temperature of a flame and the combustion gases resulting therefrom by superimposing an electrical discharge across the flame are known. However, the methods and apparatus of the prior art are not adapted for the production of carbon black because they require the use of cooled electrodes which result in large heat losses. Large heat losses are definitely undesirable in a carbon black reaction system. Furthermore, the methods and apparatus of the prior art for the production of carbon black are not adapted for supplying a part of the necessary heat from sources other than combustion of the fuel and/or a portion of the make hydrocarbon (carbonaceous reactant). The present invention overcomes these deficiencies of both fields of the prior art.

The present invention provides a method and an apparatus for the production of carbon black wherein only a portion of the necessary heat is supplied by combustion of a fuel and/or a portion of the make hydrocarbon and the remainder is supplied by electrical power. Thus, in the production of carbon black in accordance with the present invention, a portion of the necessary heat is obtained from that contained in a mass of hot combustion gases and the remainder is supplied by superimposing a distributed discharge on said gases, thus electrically augmenting the heat in said combustion gases. The present invention also provides an improved apparatus and an improved method for the production of high-temperature gases.

An object of this invention is to provide a method and an apparatus for the production of valuable carbon blacks. Another object of this invention is to provide an improved apparatus for the production of high-temperature gases which are useful in the production of carbon black, and elsewhere. Another object of this invention is to provide an improved apparatus for the production of high-temperature gases by electrical augmentation of a flame and/or the resulting combustion gases wherein cooling of the electrodes is eliminated. Another object of this invention is to provide a method of producing carbon black wherein a part of the necessary heat is supplied from sensible heat normally contained in a mass of hot combustion gases and the remainder is supplied from electrical power. Another object of this invention is to provide a method of producing carbon black wherein the heat supplied by a flame and/or a mass of hot combustion gases is augmented by superimposing a distributed electrical discharge across and/or through said flame and/or through said gases. Other aspects, objects, and advantages of the invention will be apparent to those skilled in the art in view of this disclosure.

Thus, according to the invention, there is provided an apparatus for producing a stream of high-temperature gases, comprising, in combination: a generally cylindrical heat and electrically insulated first chamber; a first electrode means comprising an electrically conducting refractory liner disposed within said chamber around the inner wall thereof for at least a portion of its length; a second electrode means spaced apart from the upstream end of said liner; means for introducing a stream of gases into the space between said electrodes; and means for creating a substantial distributed electrical discharge between said first and second electrode means.

Further according to the invention, there is provided a process for producing a stream of high-temperature gases, which process comprises: establishing and maintaining a rotating mass of combustion gases in a generally cylindrical first zone; establishing and maintaining a substantial electrical discharge distributed across said rotating mass of gases from a first locus to a second locus; and passing substantially all of said gases through said discharge to increase the temperature of said gases.

Still further according to the invention, there is provided a process for producing carbon black which, broadly speaking, comprises maintaining carbon black-producing conditions in a zone for producing high-temperature gases from hot combustion gases and forming said carbon black from an essentially hydrocarbon feedstock introduced into said zone and/or from a portion of the fuel used in making said combustion gases.

Figure 1:
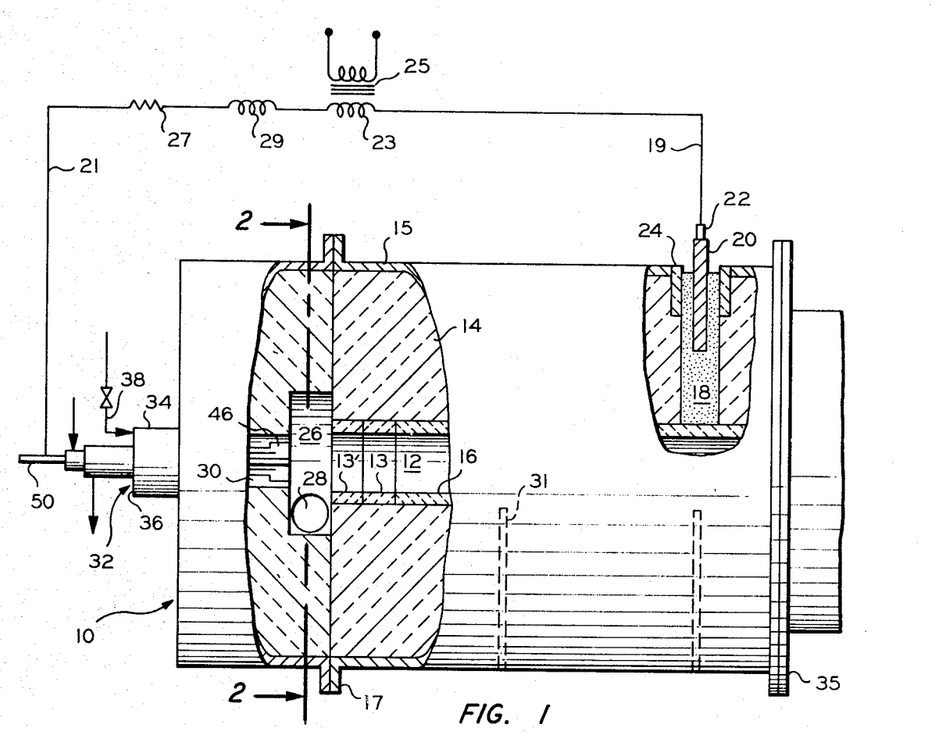
FIG. 1 is a diagrammatic illustration, partly in cross section, of one type of furnace which can be employed in the practice of the invention.

Referring now to the drawings, wherein like reference numerals are employed to denote like elements, the invention will be more fully explained. In FIG. 1 the furnace there illustrated, designated generally by the reference numeral 10, comprises a generally cylindrical heat and electrically insulated chamber 12 having a length greater than its diameter. As shown in the drawing, said chamber 12 is formed from a heat and electrical insulating material 14. Any suitable heat and electrical insulating material, e.g., aluminum oxide, silica, magnesia, silica-magnesia, silica-zirconia, and the like, can be employed in the practice of the invention. A first electrode means comprising an electrically conducting refractory liner 16 is disposed within said chamber 12 around and along the inner wall thereof. Preferably, the upstream end of said liner is spaced apart from the upstream end of said chamber 12, leaving a portion of said inner wall electrically nonconducting. Said liner 16 can be fabricated from any suitable electrically conducting refractory, e.g., silicon carbide, zirconia, thoria, titania etc. If desired, the upstream end portion of said liner 16 can be fabricated in removable cylindrical sections as shown to facilitate the spacing of the upstream end of the liner from the upstream end of chamber 12. Thus, a series of sections 13 and 13' of the same or different lengths, made of either a conducting refractory or nonconducting refractory material, can be employed. Said sections can be inserted or removed by parting the furnace at the flange 17. Varying said spacing by means of said sections 13 and 13' provides one means for varying the spacing between electrodes as discussed further hereinafter. An electrical conducting means comprising a bed of graphite powder 18 having a graphite rod 20 embedded therein and a suitable electrical connection 22 attached to said graphite rod extends through the metal shell 15 and the insulating wall 14 of said chamber 12 into contact with said refractory liner 16. Said electrical conducting means thus provides means for furnishing an electrical connection to said liner 16 and, along with the electrical connection to an upstream electrode and a power source, comprises means for establishing an electrical discharge between said electrodes. Any other suitable electrical power connection to said liner 16 can be employed. As shown in the drawing, said bed of graphite powder 18 is insulated from metal shell 15 by means of a suitable high temperature insulator 24, e.g., magnesium silicate, magnesia, and the like, which extends a short distance into the heat and electrical insulation 14.

Figure 2:
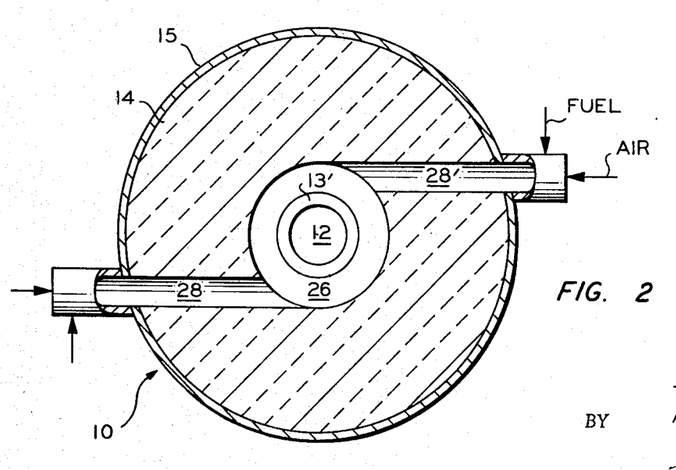
FIG. 2 is a cross section along the lines 2—2 of FIG. 1.

Another generally cylindrical chamber 26, having a diameter greater than its length and greater than the diameter of said chamber 12 is connected at its downstream end to the upstream end of said chamber 12 in axial alignment and open communication therewith. As shown in the drawing, said chamber 26 is also formed from a heat and electrical insulating material 14. At least one inlet tunnel 28 communicates tangentially with said chamber 26. Preferably, two of said inlet tunnels 28 and 28' are employed as illustrated in FIG. 2. Although not shown in the drawing, it will be understood that a transfer conduit connects with the downstream end of chamber 12 at flange 35. Said transfer conduit can be the same as, smaller than, or larger in diameter than chamber 12. Quench inlet conduits (not shown) are usually provided to the interior of said transfer conduit for quenching the effluent from chamber 12 when the furnace is employed for production of carbon black. Said quenching is carried out in conventional manner and reduces the temperature of the effluent to a temperature below that at which carbon black is formed, e.g., to a temperature less than about 1,500° F.

An electrode chamber 30 adjoins the upstream end of said chamber 26 in axial alignment and open communication therewith. As shown in the drawing, said electrode chamber 30 is formed from or in a refractory material 14 as are said chambers 12 and 26. An insulator plug, designated generally by the reference numeral 32, comprises a metal shell 34 having threads on the inner end thereof and a cylinder of suitable insulating material 36, e.g., magnesium silicate, magnesia, and the like disposed within said metal shell 34. Said threads provide another means for varying the spacing between the upstream electrode 46 and the downstream electrode 16. A passageway 38 extends through said body of insulating material 36 into a communication with electrode chamber 30 for supplying a purge gas thereto, if desired. The use of a purge gas is not essential in the practice of the invention. When a purge gas is desired to prevent recirculation in the electrode chamber 30, any suitable gas such as air, nitrogen, flue gases, helium, argon, and the like, can be used.

An upstream electrode assembly extends through said body of insulating material and into said electrode chamber 30. As shown more clearly in FIG. 4, said electrode assembly comprises a first conduit 40 having an inner end and an outer end with respect to said electrode chamber 30. A second conduit 12, also having an inner end and an outer end with respect to said electrode chamber 30, is disposed within said first conduit 40 to provide an annular space 44 therebetween. Said outer end of said second conduit 42 extends beyond said outer end of said first conduit 40. A cap 46, formed of a metal having a high thermal conductivity, e.g., copper, silver, gold, platinum, tungsten, etc., is positioned on and surrounds the inner end of said first conduit 40 and the inner end of said second conduit 42 leaving a space between said conduit ends and the inner end wall of said cap. An aperture 48 is provided in said cap 46. A third conduit 50, also having an inner end and an outer end with respect to said electrode chamber 30, is positioned within said second conduit 42 to provide an annular space 52 therebetween. It will be noted that the inner end of said third conduit 50 extends through said aperture 48 in cap 46. The outer end of said third conduit 50 extends beyond the outer end of said second conduit 42. As shown in the drawing, the outer end of first conduit 40 is joined to the outer end portion of said second conduit 42 by means of a suitable closure means, thus closing the outer end of annular space 44. The outer end of second conduit 42 is attached to the outer end portion of third conduit 50 by means of a suitable closure means, thus closing said annular space 52. Inlet 54 and outlet 56 provide means for circulating a suitable cooling medium, e.g., water or other suitable fluid, through annular space 52, the space 58 within cap 46, and annular space 44, thus providing means for cooling the entire electrode assembly.

Figure 4:
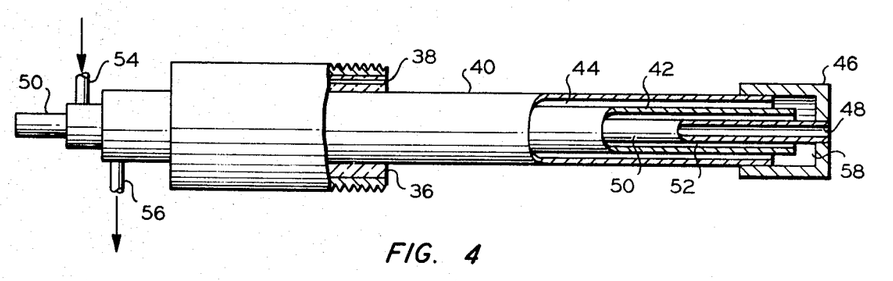
FIG. 4 is a view, partly in cross section, illustrating details of the upstream electrode assembly shown as being employed in the furnace of FIG. 1, but which can also be employed in the furnace of FIG. 3.

In said electrode assembly the face of cap 46 is the "working" portion of the electrode. However, since the conduits connected to said cap conduct the current thereto, they are a part of the electrode. Also, it will be understood that when an electrical connection is made to conduit 50 (as described elsewhere herein) that the fluid conduits connected to 54 and 56 are nonconducting.

Any suitable electric circuit connected to a suitable power source, either AC or DC, can be employed in the practice of the invention. The circuit illustrated diagrammatically in FIG. 1 comprises a lead 19, which may be grounded, connected via the means shown at 22, 20, and 18 to the liner electrode 16, and another lead 21 connected to the upstream electrode 46 via a suitable connection to conduit 50. An input circuit 23 including a transformer 25 is connected to supply alternating current to said lead wires 19 and 21. As a safety measure, to prevent arcing and runaway current in case the voltage should become too high, a resistance 27 and an inductance 29 can be provided in said input circuit 23. Said circuit and connecting lead wires, per se, form no part of the invention and any other suitable means for supplying power to said electrodes 16 and 46 can be employed.

Figure 3:
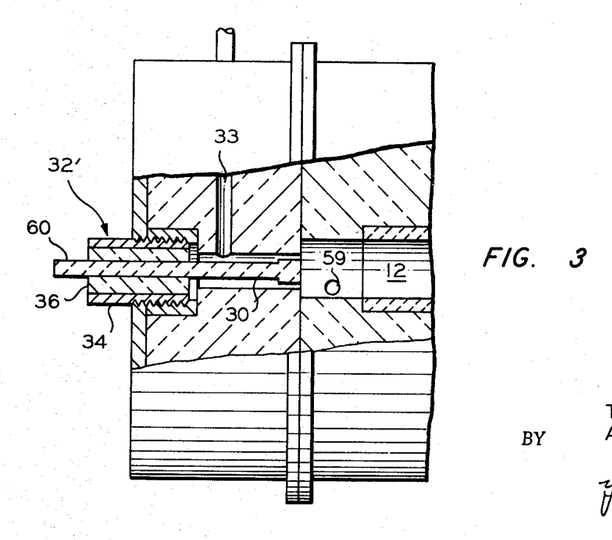
FIG. 3 is a diagrammatic illustration, partly in cross section, of another type of furnace which can be employed in the practice of the invention.

In FIG. 3 there is shown another furnace in accordance with the invention, the downstream portion of which is like the downstream portion of the furnace shown in FIG. 1. The furnace of FIG. 3 differs from the furnace of FIG. 1 primarily in the omission of chamber 26. In the furnace of FIG. 3, the electrode chamber 30 adjoins the upstream end of said chamber 12 in axial alignment and open communication therewith. As shown in the drawing, the upstream electrode assembly comprises an insulator plug, designated generally by the reference numeral 32', which is substantially the same as said insulator plug described above in connection with FIGS. 1 and 4. Although not shown, a purge gas passageway 38 can be provided in insulator plug 32'. Extending through said insulator plug 32' and into said electrode chamber 30 is a solid electrode 60. As here shown, said electrode is formed from a suitable refractory material, e.g., silicon carbide, thoria, zirconia, etc. If desired, the insulator plug and electrode assembly of FIG. 1 can be employed in the furnace of FIG. 2. Auxiliary inlet 33 communicating with chamber 30 is provided for introduction of purge gas, discharge initiator, or other material.

Figure 5:
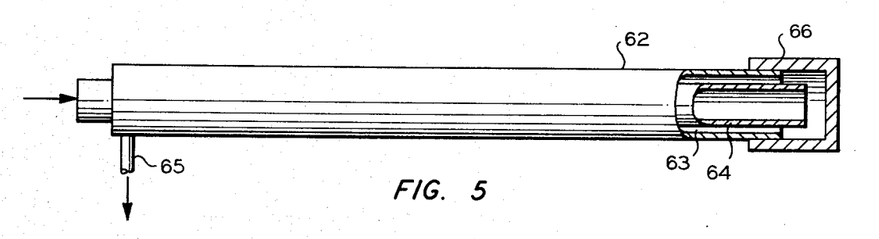
FIG. 5 is a view, partly in cross section, of another upstream electrode assembly which can be employed in the furnace of either FIG. 1 or FIG. 3.

In FIG. 5 there is shown another form of a fluid-cooled electrode assembly which can be employed in the practice of the invention. This electrode assembly comprises an outer conduit 62 having an inner conduit 64 disposed concentrically therein. A metal cap 66 formed of a suitable metal having a high thermal conductivity (similar to cap 46 of FIG. 4) is attached to and surrounds the inner end of first conduit 62 and second conduit 64, closing the inner ends of said conduits and the annular space between said conduits 62 and 64, similarly as in FIG. 4, and thus providing for circulation of a cooling medium, e.g., water, through conduit 64, annular space 63, and through outlet 65.

Referring again to FIGS. 1 and 2, in the operation of one embodiment of the invention a combustible mixture of a fuel and a free oxygen-containing gas, e.g., air, is introduced into at least one of tangential tunnels 28 and 28' which communicate tangentially with chamber 26. The fuel used in forming said combustible mixture can be any suitable fuel, either liquid, solid, or gaseous. Generally speaking, a gaseous fuel such as natural gas or a normally gaseous hydrocarbon is preferred. Liquid hydrocarbon fuels are the next most preferred fuel. Any suitable means can be employed for introducing and/or forming said combustible mixture in inlet tunnels 28 and 28', e.g., the conduits shown in FIG. 2, and the burner shown in U.S. Pat. No. 2,780,529. Burning of said combustible mixture is initiated and substantially completed in inlet tunnel 28 and/or 28'. Any portion of said mixture which is not burned in said inlet tunnels is burned along the periphery of chamber 26. Upon continued injection of combustible mixture into said inlet tunnel 28 and/or 28', the resulting combustion mixture exiting therefrom enters chamber 26 and follows a spiral path around same toward the axis thereof. When the spiral becomes less than the diameter of chamber 12, the gaseous flow changes from a spiral to a helical form, and following this latter pattern enters said chamber 12.

A distributed electrical discharge is initiated across and/or through said combustion mixture in chamber 26. Said discharge extends between upstream electrode 46 and downstream liner electrode 16. For convenience, electrode 46 is sometimes referred to herein as a first locus and electrode 16 as a second locus. When using AC current the discharge can originate at either electrode. When using DC current the originating electrode will depend upon the polarity. Said discharge can be initiated in any of several ways. One way to initiate said discharge is to increase the applied voltage. Another way is to supply an ionization additive such as potassium chloride or nitrous oxide into said combustion mixture. Said ionization additive can be introduced in any suitable manner such as with the free oxygen-containing gas, or can be introduced directly into chamber 26 by any suitable means. For example, if only one of said tangential inlet tunnels is being employed, the other can be employed to introduce said ionization additive. We have discovered that when the refractory walls of chambers 26 and 12 are at a high temperature in the order of 2,200° to 2,300° F., the electrical discharge can be initiated at a lower applied voltage. We have also discovered that the introduction through feed conduit 50 of a material capable of increasing the temperature in the immediate vicinity of the upstream electrode will also permit the discharge to be initiated at a lower applied voltage. For example, if chamber 26 is operating under oxygen-rich conditions, then the introduction of a fuel (preferably one with a high flame speed such as acetylene) through conduit 50 results in a higher temperature at the electrode face and permits initiation of the discharge at a lower applied voltage. Fuels which can be used for this purpose are those which decompose exothermically, i.e., liberate energy on decomposition. Included among such fuels are hydrogen, acetylene, ethylene, carbon disulfide, and metal hydrides such as antimony hydride, arsenic hydride, and the like. Gaseous fuels or fuels which can be readily vaporized are preferred. Presently more preferred fuels are hydrogen, acetylene, and ethylene. Similarly, when chamber 26 is operating under fuel-rich conditions, then the introduction of a gas rich in oxygen through conduit 50 results in a higher temperature at the electrode face. The localized region of higher temperature at the electrode face results in a higher ionization and thus permits initiation of a smooth discharge at a lower applied voltage.

After the electrical discharge has been established, the voltage level (if a high voltage level was employed) can be decreased to the desired operating level, the stoichiometric ratio of the air and fuel mixture and the throughput thereof adjusted to the desired levels, and the furnace operated for the production of a stream of high temperature gases as illustrated and discussed in the examples given hereinafter.

When it is desired to operate the furnace for the production of carbon black, it is necessary to establish carbon black-producing conditions in chambers 26 and 12. Said conditions include a temperature sufficient to cause the decomposition of at least a portion of the carbonaceous reactant into carbon black and an overall stoichiometric level of preferably not more than about 50 per cent and preferably above 25 per cent. However, said levels can be affected to some extent by furnace geometry and it is within the scope of the invention to employ stoichiometric levels outside the above range so long as carbon black-producing conditions are maintained. The temperature in chambers 26 and 12 will preferably be above at least about 2,500° F.

Said overall stoichiometric level can be maintained at the desired level in any suitable manner. Commonly, the stoichiometric level can be controlled by controlling the amount of carbonaceous reactant or feedstock introduced. Said stoichiometric level can also be controlled by controlling the level on the fuel-air mixture being burned in tangential tunnels 28 and/or 28'. Or, a combination of said two methods can be used.

Thus, when it is desired to operate the furnace for production of carbon black, and usually after discharge has been established, a stream of a reactant capable of being converted to carbon black, e.g., an essentially hydrocarbon material, is then passed through said conduit 50 into chamber 26 and then into chamber 12. The electrical discharge augments the sensible heat contained in the combustion gases, thus making it possible to supply less heat from the combustion of the fuel for a given heat level required for a given amount of reactant. If desired, said reactant can be preheated by conventional means (not shown) prior to introduction via conduit 50. Said reactant is passed axially through chamber 26 and enters chamber 12 while surrounded by the heated combustion gases. Carbon black is formed by the decomposition of said reactant due to the heat imparted thereto from the surrounding gases, and/or from partial burning of said reactant, under carbon black-producing conditions. The resulting mixture of gases comprises a "smoke" containing the carbon black product in suspension and is withdrawn from chamber 12, quickly quenched in a conventional manner to a temperature below that at which carbon black formation takes place, and is then passed to conventional equipment for the separation of the carbon black therefrom.

In another embodiment of the invention, a hydrocarbon-rich, noncombustible mixture of a hydrocarbon and a free oxygen-containing gas which will not burn at ordinary temperatures is introduced via at least one of said tangential inlet tunnels 28 and 28' into chamber 26. In this embodiment of the invention, the upstream electrode assembly shown in FIG. 3 can be conveniently employed if desired. When the swirling mass of gases has been established in chamber 26, a distributed electrical discharge is established across and/or through said gases. Said discharge can be established by first introducing a stoichiometric mixture and then adjusting the mixture to the hydrocarbon-rich condition after the discharge is established. Other methods as set forth in the examples can also be used to establish the discharge. This electrical discharge quickly heats said gases to carbon black-producing temperatures, thus providing carbon black-producing conditions, and at least a portion of the hydrocarbon in said mixture is converted to carbon black in chamber 26 and chamber 12 and recovered as described above.

In another embodiment of the invention, a mixture of combustion gases resulting from the combustion of a combustible mixture of a fuel and free oxygen-containing gas is introduced via the tangential inlet 59 in the upstream end of chamber 12 in the furnace of FIG. 3. It will be understood that tangential inlet 59 communicates tangentially with the inner periphery of chamber 12, similarly as do inlet tunnels 28 and 28' with respect to chamber 26 in FIG. 1. Also, if desired, two inlets 59 can be provided. In this embodiment of the invention, the upstream electrode assembly shown in FIGS. 1 and 4 can be employed in the furnace of FIG. 3. After the swirling mass of combustion gases has been established in the upstream end of chamber 12, an electrical discharge is initiated across and/or through said combustion gases to heat same as described above. The remainder of the operation substantially follows that described in the first above-described embodiment of the invention where carbon black is produced.

In another embodiment of the invention, a mixture of a vaporous, essentially hydrocarbon reactant and a free oxygen-containing gas is introduced via the tangential inlet 59 in chamber 12 of the furnace of FIG. 3. In this embodiment of the invention, an upstream electrode assembly substantially like that shown in FIG. 3 can be employed. An electrical discharge is established across and/or through said mixture of hydrocarbon and free oxygen-containing gas and rapidly heats same to carbon black-producing conditions and carbon black is produced and recovered as described in the above-described second embodiment of the invention.

It will be noted that the electrical discharge employed in the practice of all the embodiments of the invention is a "distributed discharge". As used herein and in the claims, unless otherwise specified, the term "distributed discharge" refers to an electrical discharge which is distributed more or less uniformly across and/or through the turbulent mass of gases between the upstream and downstream electrodes. It should be emphasized that such a distributed discharge is a separate and distinct entity from arcs or plasma discharges. An arc is a low voltage, high current discharge concentrated into a narrow filament between two electrodes. In a plasma torch sufficient energy is introduced in a concentrated discharge to ionize an inert gas, whereas in electrical augmentation as employed in this invention the distributed discharge is throughout an already ionized conductive gas and is a diffuse discharge. The distributed discharge employed in the practice of this invention is a relatively high voltage, low current discharge which, because of its distribution, in effect supplies heating current flowing through the mass of gases. At least two advantages result from the application of such a discharge. First, the electrode problem is much simpler because of smaller current requirements for the same power input and, secondly, substantially the entire volume of said turbulent mass of gases passes through the discharge and is heated directly by said discharge.

In the practice of the invention, from about 25 to about 90 per cent of the heat necessary in the carbon black-forming reaction can be supplied electrically. As will be understood by those skilled in the art, the amount of power required to establish and maintain the distributed discharge will depend upon the degree of ionization of the turbulent mass of gases between the electrodes, the volume of gases passing through the space between the electrodes, the design of the particular reactor or furnace employed, the amount of heat required, and other factors. Thus, the invention is not to be limited by any specific ranges of voltage or applied power, flow rates of gases, or stoichiometric ratios.

It will be noted that in the practice of the invention the discharge is distributed across and/or through a rotating mass of gases. Said gases are thus in a highly turbulent condition which greatly increases the diffuse conditions of the discharge. The highly turbulent conditions of the rotating combustion gases also contributes to establishment of extremely uniform temperatures throughout the mass of gases. This is a distinct advantage over electrical augmentation processes wherein the discharge is distributed across a flame because, as is well known, temperatures across a flame are not uniform.

The following examples will serve to further illustrate the invention. In these examples, a furnace having the general configuration of that illustrated in FIGS. 1 and 2 was employed. Chamber 12 had an internal diameter of about 2 inches and a length of about 14 inches. The length of the downstream electrode or liner 16 was about 12 inches. The diameter of chamber 26 was about 3.5 inches and the length thereof was about 1.5 inches. The diameter of electrode chamber 30 was about 1.12 inches. These dimensions and all other dimensions given herein are given for illustrative purposes only and are not to be limiting upon the invention. For convenience, due to availability, alternating current was used in all the examples given below.

EXAMPLE I

A series of runs was made for the production of high-temperature gases. The furnace employed was essentially the same as that illustrated in FIGS. 1 and 2 except that said furnace was provided with only one tangential inlet tunnel 28. The upstream electrode had a configuration like that illustrated in FIG. 5 and the diameter of the downstream face of said electrode was about seven-eighths inch. The spacing between the face of said upstream electrode and the upstream end of liner electrode 16 was 3.5 inches. In these runs, mixtures of air and propane at various stoichiometric levels (measured with respect to the air) were burned in said tangential tunnel and the resulting combustion gases passed tangentially into chamber 26. In Run No. 1 no discharge was employed. In Run 2 a distributed discharge was established between said electrodes and across and/or through said gases by using potassium chloride as an ionization initiator. Said potassium chloride was introduced into said combustion gases by subliming same into a stream of nitrogen and then mixing said nitrogen with the air stream. After Run 2 was completed, use of the ionization initiator was discontinued, and Runs 3 and 4 were carried out successively by changing the operating conditions as shown in table I below. In Run 5 the discharge was initiated by temporarily using a stoichiometric air-propane mixture (for maximum flame temperature) and applying a high voltage (6,200 volts) to the electrodes. After the discharge had been initiated, the stoichiometric ratio on the air-propane mixture and the electrical power level were adjusted to the values indicated in table I below. Runs 6, 7, and 8 were another series of successive runs carried out by initiating the discharge by using potassium chloride, similarly as described above, and then adjusting the operating conditions to the values indicated in table I below. The refractory temperatures for all runs were obtained by means of a thermocouple positioned in thermowell 31. Data for said runs are set forth in table I.

TABLE I

| Run No. | Burner air, s.c.f.h. | Stoichiometric, percent | Ionization additive | Impedance, ohms | Applied volts | Discharge Volts | Discharge Amps | Discharge K.v.a. | Refractory temp., F. |
|---|---|---|---|---|---|---|---|---|---|
| 1 | 520 | 129 | None | | None | | | | 1,775 |
| 2 | 520 | 129 | 1.0 g./hr. KCl | 2.1 | 285 | 975 | 7.7 | 7.7 | |
| 3 | 520 | 129 | None | 2.2 | 300 | 1,560 | 6.3 | 9.9 | 2,260 |
| 4 | 520 | 129 | ....do.... | 2.0 | 320 | 1,495 | 7.8 | 11.8 | 2,340 |
| 5 | 520 | 82 | ....do.... | | None | | | | 1,985 |
| 6 | 520 | 82 | ....do.... | 2.0 | 315 | 1,560 | 7.5 | 11.8 | 2,850 |
| 7 | 520 | 60 | ....do.... | 1.9 | 300 | 1,560 | 7.2 | 11.3 | 2,445 |
| 8 | 520 | 60 | ....do.... | | None | | | | 1,815 |

The data in the above table I show that the discharge voltage was lower when the potassium chloride initiator was absent. The data also show that relatively constant power levels could be obtained at stoichiometric levels ranging from 60 to 130 percent.

In other runs carried out in essentially the same manner, it was discovered that if the refractories in the furnace were very hot (in the order of 2,200–2,300° F.) a distributed discharge could be initiated at all stoichiometric ratios between about 70 and about 150 per cent using an airflow of 520 s.c.f.h. Nitric oxide was also tested as an additive for initiating discharge and also found to be satisfactory, but not as effective as potassium chloride.

EXAMPLE II

Another series of runs was carried out in the same apparatus as employed in example I. In this series of runs no ionization initiator was used. The discharge was initiated in Run No. 1 in the same manner as in Run 5 of example I. After the discharge had been initiated, the stoichiometric level and other conditions were adjusted to the desired values. Runs 2 and 3 were each successive runs made upon completion of the previous run by adjusting the operating conditions to the new desired conditions. The composition of the air-propane mixture was maintained at 80 per cent of stoichiometric with an airflow of 520 s.c.f.h. after the discharge had been initiated. Data from this series of runs are set forth in table II below. The runs showed that constant power input could be obtained at different combinations of applied voltage and inductive impedance. However, the data indicated that lower applied voltage and low inductive impedance produced a more favorable power factor.

EXAMPLE III

Another series of runs was carried out employing the same furnace and in substantially the same manner as in example II except that all three runs were individual runs, i.e., the discharge was initiated at the start of each run. No ionization initiator was used. These runs were carried out with a relatively constant applied voltage and inductive impedance to determine the effect of varying the stoichiometric level on electrical power input and discharge voltage. The data set forth in table III below show that power level and power factor were slightly higher at stoichiometric than at rich or lean conditions. Said data also indicate that the discharge voltage does not appear to vary appreciably under these conditions.

EXAMPLE IV

Another series of runs was carried out in the same furnace and in substantially the same manner as employed in example II. In this series of runs the stoichiometric level of the air-propane mixture was maintained constant at 125 per cent and the air throughput was varied. Data from this set of runs are set forth in table IV below.

TABLE II

| Run No. | Impedance, ohms | Applied volts | Discharge Volts | Discharge Amps | Kw. | Kva. | Power factor |
|---|---|---|---|---|---|---|---|
| 1 | 2.1 | 355 | 1,610 | 8.6 | 9.2 | 13.9 | 0.66 |
| 2 | 2.5 | 400 | 1,625 | 8.6 | 9.2 | 14.0 | 0.66 |
| 3 | 2.9 | 460 | 1,715 | 9.1 | 9.2 | 15.6 | 0.95 |

TABLE III

| Air rate, s.c.f.h. | Stoichiometric level, percent | Impedance, ohms | Applied volts | Discharge Volts | Discharge Kw. | Power factor | Refractory temp., °F. |
|---|---|---|---|---|---|---|---|
| 515 | 79 | 2.54 | 455 | 1,560 | 10.0 | 0.63 | 2,555 |
| 515 | 101 | 2.61 | 460 | 1,490 | 11.6 | 0.76 | 2,640 |
| 515 | 128 | 2.65 | 465 | 1,500 | 10.6 | 0.70 | 2,430 |

TABLE IV

| Run No. | Throughput, s.c.f.h., air | Impedance, ohms | Applied volts | Discharge Volts | Discharge Kw. | Power factor | Electric power percent of combustion power |
|---|---|---|---|---|---|---|---|
| 1 | 510 | 2.4 | 455 | 1,560 | 11.0 | 0.66 | 86 |
| 2 | 770 | 2.5 | 455 | 1,820 | 12.0 | 0.67 | 62 |
| 3 | 1,050 | 2.4 | 455 | 1,820 | 12.4 | 0.67 | 47 |
| 4 | 1,320 | 2.3 | 455 | 1,950 | 13.0 | 0.66 | 40 |
| 5 | 1,590 | 2.3 | 455 | 2,080 | 13.0 | 0.62 | 33 |
| 6 | 1,590 | 2.0 | 375 | 1,950 | 12.0 | 0.72 | 31 |

The inductive impedance was substantially constant for the first five runs. As air throughput was increased, the discharge voltage and power input increased slightly. The power factor was substantially constant. Run No. 6 was carried out at the same throughput as Run No. 5 but with lower applied voltage and lower inductive impedance. These conditions produced an improvement in power factor. The discharge appeared to be more diffused at the higher throughputs.

EXAMPLE V

In another series of runs carried out in the same apparatus as employed in Example I, an inert gas was introduced to the face of electrode 46 via conduit 50. In this series of runs no ionization initiator was used. Prior to initiating the discharge, a mixture of propane and air at a stoichiometric level of about 108 per cent was burned in tangential inlet tunnel 28 for a period of time sufficient for the refractories to reach a temperature above about 2,200° F. The discharge was initiated by simply turning on the power and a distributed discharge was obtained immediately due to the hot refractories. After equilibrium had been established (Run 1—control), a stream of nitrogen was introduced through conduit 50 for Run 2. Data for the two runs are set forth in table V below.

TABLE V

| Run No. | Propane, s.c.f.h. | Electrode gas/nitrogen, s.c.f.h. | Stoichiometric, overall percent | Discharge, volts | Power, kw |
|---|---|---|---|---|---|
| 1 | 29.7 | None | 108 | 1,365 | 8.8 |
| 2 | 29.7 | 34 | 108 | 1,690 | 9.6 |

Comparing Run 1 with Run 2 shows that the power level (kw.) in Run 2 was some greater than in Run 1. However, it should be particularly noted that the discharge voltage in Run 2 was considerably greater than in Run 1. While it is not intended to limit the invention by any theories as to operation thereof, it appears that the inert gas introduced via conduit 50 produces a cool region around the face of electrode 46, thus creating a region of higher resistance due to decreased ionization. This apparently results in an increase in the discharge voltage and puts more energy into the distributed discharge at about the same current level.

For the purposes of this invention, nitrogen is considered as an inert gas. Any suitable inert gas such as said nitrogen, helium, argon, crypton, xenon, and neon can be employed in the practice of this embodiment of the invention. The amount of said inert gas so employed can be any suitable amount sufficient to cause an increase in the discharge voltage but insufficient to disrupt the discharge. As will be understood by those skilled in the art in view of this disclosure, the discharge can be disrupted by injecting too much inert gas and thus cooling the face of electrode 46 to too great an extent. The actual amount of said inert gas which can be employed will depend upon other conditions in the reactor, e.g., stoichiometric level, flow rates, etc., and the furnace geometry. However, usually an amount up to about 10 per cent, preferably not more than about 5 per cent, of the total volume of gases being passed through the reactor can be so used.

EXAMPLE VI

A run was made in a furnace essentially the same as that illustrated in FIGS. 1 and 2 except that said furnace was provided with only one tangential inlet tunnel 28. The diameter of the face of electrode 46 was about seven-eighths inch, and the spacing between electrodes 46 and 16 was about 2.5 inches. In this run a fuel-rich combustible mixture of air and propane was burned in said tangential tunnel and the resulting combustion gases passed tangentially into chamber 26. A distributed discharge was established between said electrodes and across and/or through said combustion gases by first using a stoichiometric mixture of air and propane to obtain a temperature of about 3,300° F., which served to ionize the gases and establish a distributed discharge. Thereafter the flow rates were adjusted to those given in table VI below. The make hydrocarbon was ethylene and 17.1 s.c.f.h. was introduced via conduit 50 axially into chamber 26, passed therethrough, and then passed into chamber 12 while surrounded by the electrically augmented hot combustion gases. The effluent gases from chamber 12 containing the carbon black product suspended therein were quenched in conventional manner and said carbon black separated therefrom in conventional manner. Tests on the carbon black product and operating conditions for said furnace are set forth in table VI below as Run No. 1.

EXAMPLE VII

Another run was carried out in the same furnace employed in example VI. In this run a mixture of air and propane was used as the source of combustion gases and also as the source of the make hydrocarbon or reactant. This run was initiated by passing 520 s.c.f.h. of air at 130 percent of stoichiometric with propane through the tangential inlet 28 to establish a swirling turbulent mass of gases in chamber 26. A distributed discharge was established across said mass of gases by first applying a high initial voltage of about 6,000 volts and then reducing the voltage to the operating voltage of 1,690 volts. After said discharge had been established the airflow was reduced to 145 s.c.f.h., thus reducing the stoichiometric level to about 31 percent. Said electrical discharge heated the mass of gases to carbon black-producing temperatures and carbon black was formed from a portion of the propane contained in the mixture of gases. The carbon black product was separated from the effluent from chamber 12 in conventional manner. Operating conditions on the furnace and tests on said carbon black product are set forth in table VI below as Run No. 2.

TABLE VI

| Run | Furnace Conditions | | | | | | | Electrical Power | | | Refractory Temp., °F. | Carbon Black Product | |
|---|---|---|---|---|---|---|---|---|---|---|---|---|---|
| | Air rate s.c.f.h. | Propane rate, s.c.f.h. | Stoichiometric, percent | B.t. per hr. | Inductive Impedance, ohms | Volts | Amps | Kw. | Power factor | Percent of total | Percent of combustion | | Oil absorption cc./gram | N₂ surface area, sq. meters/gram |
| 1 | 162 | 10.0 | 69 | 17,300 | 2.4 | 1,560 | 10.6 | 8.2 | 0.49 | 62 | 162 | 2,630 | 1.36 | 154 |
| 2 | 145 | 19.8 | 31.1 | 15,300 | 2.0 | 1,560 | 9.3 | 8.0 | 0.55 | 72 | 273 | 2,440 | 1.49 | 272 |

EXAMPLE VIII

The carbon black obtained in example VI was compared with a carbon black of commerce having about the same surface area in the compounding of a SBR rubber; the results show that a high-quality black was produced by electrical augmentation of the hydrocarbon flame:

|  | Compounding Recipe, parts by weight |
|---|---|
| SBR 1500 (a) | 100 |
| Black | 50 |
| Aromatic Oil | 10 |
| Zinc Oxide | 3 |
| Stearic Acid | 1 |
| Flexamine (b) | 1 |
| Sulfur | 1.75 |
| Santocure (c) | 1.3 |

Physical Properties of Vulcanizates

| Black Used | Example VI | Philblack E (d) |
|---|---|---|
| $\nu \times 10^4$, moles/cc (e) | 1.64 | 1.61 |
| 300% Modulus, p.s.i. (f) | 980 | 1370 |
| Tensile, p.s.i. (f) | 3520 | 3660 |
| Elongation, % (f) | 690 | 570 |

(a) An emulsion polymerized butadiene-styrene rubber made by the recipe in ASTM D 1419-61.

(b) A physical mixture of a complex diarylamine-ketone reaction product (65%) and N,N'-diphenyl-p-phenylene-diamine (35%).

(c) N-cyclohexyl-2-benzothioazole sulfenamide.

(d) A super abrasion furnace black having a surface area of about 135 sq. m.g.

(e) Rubber World 135, 67-73, 254-260 (1956).

(f) ASTM D 412-62T. Instron Tensile Machine. Tests were made at a temperature of 80° F.

The above examples show that the method and apparatus of the invention are valuable tools for the production of high-temperature gases and production of carbon black. As shown by the examples, the apparatus is capable of operation over a wide range of operating conditions, with few, if any, real limitations except those imposed by size or capacity. For example, no maximum in power level was found within the maximum limits of the electric circuit employed. The burner or furnace of the invention can be operated over a wide range of stoichiometric ratio of air to fuel, e.g., at least from about 30 to about 160. From 25 to 90 percent of the heat required in producing carbon black can be supplied electrically.

The burner or furnace of the invention has a number of advantages. An important advantage is that heat losses are minimal. An outstanding feature is the electrode system. No cooling is required on the downstream electrode. In operation, the distributed discharge at the elongated downstream electrode is spread over a substantial portion of the electrode length, frequently the entire length. This spread would not take place if the electrode did not have an elongated tubular configuration. Said elongated configuration has the further advantages of making possible a short electrode spacing for discharge initiation and a long spacing for high discharge voltage and high power input.

As used herein and in the claims, unless otherwise specified, the term "free oxygen-containing gas" includes air, air enriched with oxygen, and essentially pure oxygen.

The term "stoichiometric level," as used herein and in the claims, unless otherwise specified, refers to or is measured with respect to the oxygen content of the free oxygen-containing gas and is considered on the basis of complete combustion to carbon dioxide and water.

While the invention has been described as using a vaporous hydrocarbon as the feedstock for the production of carbon black, the invention is not so limited. Carbon black can be produced in the burner or furnace of the invention from any of the known gaseous or liquid essentially hydrocarbon feedstocks normally used in the carbon black industry.

The high-temperature gases produced in the practice of the invention have uses other than in making carbon black. Said gases can be used in metallurgical processes such as the thermal reduction of metal ores. Said gases can also be used in chemical processes requiring high temperatures. In those embodiments of the invention wherein carbon black is a primary product, the gases remaining after separation of the carbon black therefrom, while not having as high a temperature as when carbon black is not being produced, are still valuable for heat exchange purposes. For example, said remaining gases can be used for the production of steam by heat exchange in a suitable heat exchanger or boiler.

While certain embodiment of the invention have been described for illustrative purposes, the invention obviously is not limited thereto. Various other modifications will be apparent to those skilled in the art in view of this disclosure. Such modifications are within the spirit and scope of the invention.

What is claimed is:

1. A process for producing high-temperature gases which comprises establishing an electrical discharge in substantially uniform distribution throughout a zone, passing a gas through said zone in the absence of a flame in said and in contact with said discharge to increase the temperature of said gas, said electrical discharge being distributed substantially uniformly through said gas upon passage of said gas through said zone.

2. The process as described in claim 1 in which an ionization additive is present in said gas.

3. The process as described in claim 1 in which said electrical discharge is established between two spaced electrodes one of said electrodes being subjected to a current of between about 0.08 amperes and 0.12 amperes per square inch.

4. The process as defined in claim 3 in which the electrode voltage is between about 285 and about 465.

5. The process as defined in claim 4 in which the discharge voltage is from about 975 to about 2,080.

* * * * *

UNITED STATES PATENT OFFICE

CERTIFICATE OF CORRECTION

Patent No. 3,636,300                                                         Dated: January 18, 1972

Thomas J. Gunnell and Albert F. Stegelman

It is certified that error appears in the above-identified patent and that said Letters Patent are hereby corrected as shown below:

Column 14, line 43, claim 1, after "said", second occurrence, insert -- zone --.

Signed and sealed this 13th day of June 1972.

(SEAL)
Attest:

EDWARD M. FLETCHER, JR.                     ROBERT GOTTSCHALK
Attesting Officer                                       Commissioner of Patents